ELECTRIC MULTI-CHANNEL PULSE COMMUNICATION SYSTEMS

Filed May 17, 1951 7 Sheets-Sheet 1

Inventor
CYRIL G. TREADWELL
DONALD B. MUNDAY
By Philip M. Bolton
Attorney

ELECTRIC MULTI-CHANNEL PULSE COMMUNICATION SYSTEMS

Filed May 17, 1951 7 Sheets-Sheet 2

Inventor
CYRIL G. TREADWELL
DONALD B. MUNDAY
By Philip M. Bolton
Attorney

Inventor
CYRIL G. TREADWELL -
DONALD B. MUNDAY
By Philip M. Bolton
Attorney

Oct. 4, 1955 C. G. TREADWELL ET AL 2,719,877

ELECTRIC MULTI-CHANNEL PULSE COMMUNICATION SYSTEMS

Filed May 17, 1951 7 Sheets-Sheet 4

Inventor
CYRIL G. TREADWELL
DONALD B. MUNDAY
By Philip M. Bolton
Attorney

Inventor
CYRIL G. TREADWELL
DONALD B. MUNDAY
By Philip M. Bolton
Attorney

Oct. 4, 1955 C. G. TREADWELL ET AL 2,719,877

ELECTRIC MULTI-CHANNEL PULSE COMMUNICATION SYSTEMS

Filed May 17, 1951 7 Sheets-Sheet 6

Inventor
CYRIL G. TREADWELL
DONALD B. MUNDAY
By Philip M. Bolton
Attorney

Inventor
CYRIL G. TREADWELL
DONALD A. MUNDAY
By Philip M. Bolton
Attorney

United States Patent Office 2,719,877

Patented Oct. 4, 1955

2,719,877

ELECTRIC MULTI-CHANNEL PULSE COMMUNICATION SYSTEMS

Cyril Gordon Treadwell and Donald Brearley Munday, London, England, assignors to International Standard Electric Corporation, New York, N. Y.

Application May 17, 1951, Serial No. 226,768

Claims priority, application Great Britain May 18, 1950

6 Claims. (Cl. 178—43.5)

The present invention relates to multichannel electric pulse communication systems and is concerned with channel branching arrangements in such systems.

It is very commonly the practice to operate a pulse communication system as a simple radio link between two terminal stations; that is, all channels of the system are used for through communication between the two stations. However it is sometimes required that the channels terminating at one of the stations should be distributed between several other stations, and there then arises the problem of arranging so that the pulses transmitted from the said other stations arrive at the main station at the proper times, having regard to the fact the stations will generally be at different distances from the main station.

The present invention concerns the case in which a main terminal station operates to a plurality of satellite terminal stations, to each of which certain particular channels of the system are allotted. Two different carrier frequencies are used for conveying the pulses; one of them is used for transmission of pulses from the main station, and the other for reception of pulses at that station.

It will be clear that no difficulty will be encountered with the timing of pulses transmitted from the main station, but since the satellite stations will usually be at different distances from the main station, special arrangements will be required to ensure the proper relative timing of the pulses transmitted from the satellite stations.

It is also desirable to provide so that one satellite station may be out of service (either intentionally, or as the result of a fault) without interfering with the operation of the channels to the other satellite station or stations of the system.

The invention is applicable to systems in which the pulses are transmitted over cables instead of by radio, where separate cables are provided each having branches leading to the satellite stations, such cables being used respectively for transmission and reception at the main station.

The invention, according to its broadest aspect, provides an electric multichannel pulse system for communication between a main station and a plurality of satellite stations in which particular channels are allotted to each satellite station for communication between the main station and such satellite station, and in which the signalling time is divided into a plurality of equal synchronizing periods, each synchronizing period being divided into a plurality of channel periods at least two of which are set aside respectively as phasing and synchronizing periods, comprising means at the main station for delaying the transmission of a pulse of a given channel after the reception of a pulse of the same channel, and means controlled by marker pulses transmitted from one of the satellite stations during the phasing periods for automatically adjusting the transmission delay in such manner that all channel pulses are received at the main station during the channel periods to which they respectively belong.

The invention will be described with reference to the accompanying drawings in which.

Figure 1:
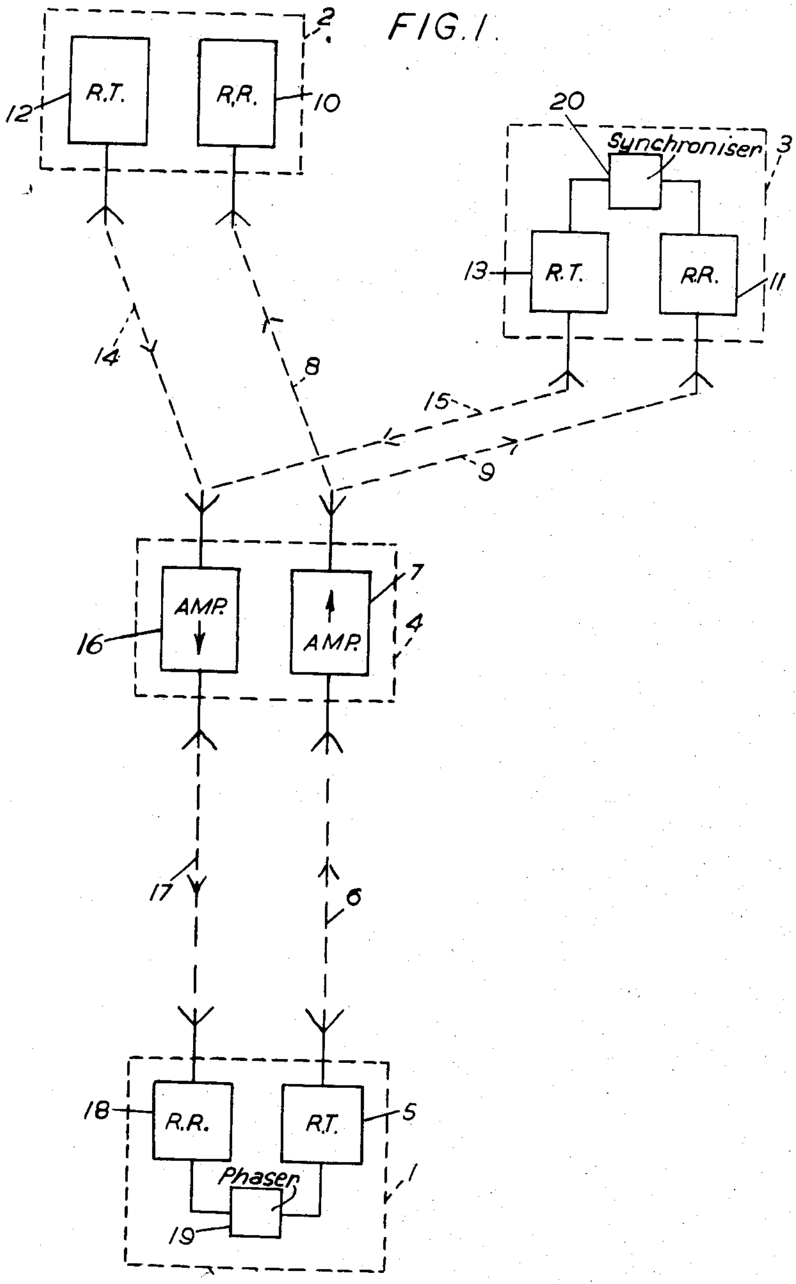
Fig. 1 shows a block schematic circuit diagram of a pulse communication system with branching arrangements according to the invention.

Fig. 1 shows a main station 1 which communicates with two satellite stations 2 and 3 by way of an intermediate repeater station 4. The station 4 could be omitted if the distances from station 1 to stations 2 and 3 are sufficiently small. Likewise additional repeater stations (not shown) might be included if necessary in any of the paths between the stations.

Communication is effected by a multichannel pulse system preferably employing time position modulation of the pulses, though duration or amplitude modulation could be used instead. For definiteness, it will be assumed that the system of the type described in U. S. Patent No. 2,462,111 of M. M. Levy for "Multi-channel Pulse Distributor" issued February 22, 1949, (see particularly the description of Figs. 3 and 4 of said patent) is a 24-channel system with the even-numbered channels operating between the main station 1 and the satellite station 2, and the odd-numbered channels operating between the main station 1 and the satellite station 3. The system could however comprise any number of channels distributed in any desired manner between the two satellite stations. Various numerical details of the system will be suggested below, but it is to be understood that these details may be altered as circumstances require.

The pulses are transmitted from the radio transmitter 5 at station 1 over path 6 to the amplifier 7 at station 4 and thence over paths 8 and 9 to the radio receivers 10 and 11, respectively, at stations 2 and 3. In the opposite direction, pulses are transmitted from the radio transmitters 12 and 13 at stations 2 and 3 over paths 14 and 15, respectively, to the amplifier 16 at the repeater station 4, and thence over the path 17 to the radio receiver 18 at the main station 1. According to the usual practice, different carrier frequencies, and/or directional antennas, will be used for the various paths, so that they are all effectively separate.

Normally, in the case of a system in which all channels operate between two given terminal stations, the transmission of pulses in the two directions is independent, and the system is effectively two separate one-way systems. In the present case, however, owing to the branching, it becomes necessary carefully to relate the timing of all the pulses transmitted over the system so that all the channel pulses received by the receiver 18 at the main station shall arrive at the proper times, having regard to the fact that the transit times from the main station 1 to the satellite stations 2 and 3 will generally be different.

Accordingly the timing of the whole system is controlled by master synchronising pulses generated in the radio transmitter 12 at the satellite station 2, which will therefore be called the master station.

At the main station 1, the times of the pulses sent out by the radio transmitter 5 are controlled from the radio receiver 18 by means of phasing arrangements illustrated in detail in Figs. 4 to 7, but represented in Fig.

1 by the block 19 in response to marker pulses received from the station 3, the times of arrival of which indicate the transit time between the stations 1 and 3. At station 3, the pulses transmitted by the transmitter 13 are directly synchronised by a conventional device 20 by the normal synchronising pulses received by the radio receiver 11 from the main station 1. These synchronising pulses are also used for synchronising the receiver 10 at the master station 2, in the usual way. The device 20 operates in the manner described at lines 35 to 45 of column 8 of U. S. Patent No. 2,462,111 already referred to.

As will be explained in detail later, the pulses sent out by the transmitter 5 are automatically timed by the phaser 19 until odd-numbered channel pulses as received by the main station 1 from station 3 fall into the proper places between the even-numbered channel pulses received from station 2.

A further feature provides so that if the master station 2 is shut down (either intentionally, or because of a fault) the odd numbered channels can still be maintained in operation to station 3. When station 2 shuts down, a train of control pulses is transmitted by the radio transmitter 5 at station 1, to the radio receiver 11 at station 3, and in response to those control pulses, the radio transmitter 13 sends out a train of normal synchronising pulses for synchronising the radio receiver 18 at the main station 1. As will be explained later, station 3 can be shut down without upsetting the operation of the even numbered channels to station 2.

It will be obvious, however, that a fault at the main station 1 must shut down the whole system.

As will be also explained later, if the master station 2 shuts down, there will be a slight delay before control of the receiver 18 can be taken over by the synchronising pulses generated by the transmitter 13.

This delay may however be sufficient to break down connections already established over odd numbered channels, and therefore means may be provided according to the invention to prevent this from happening, so that the only effect will be a short interruption of communication, the effect of which is unimportant.

Likewise, the replacement of station 2 in service is arranged only to produce a short interruption in the channels between stations 1 and 3 without breaking down any existing connections.

It should be explained that although Fig. 1 shows only two satellite stations operating with the main station 1, there might be others to which some of the channels are allotted. For example there might be an alternative master station (not shown) which could operate with the main station at times when station 2 is out of service. The timing of the whole system would then be controlled by master synchronising pulses from the alternative station. Likewise there might be an alternative station corresponding to station 3 which when in operation, would transmit marker pulses to control the timing of the pulses transmitted from the main station.

Figure 2:
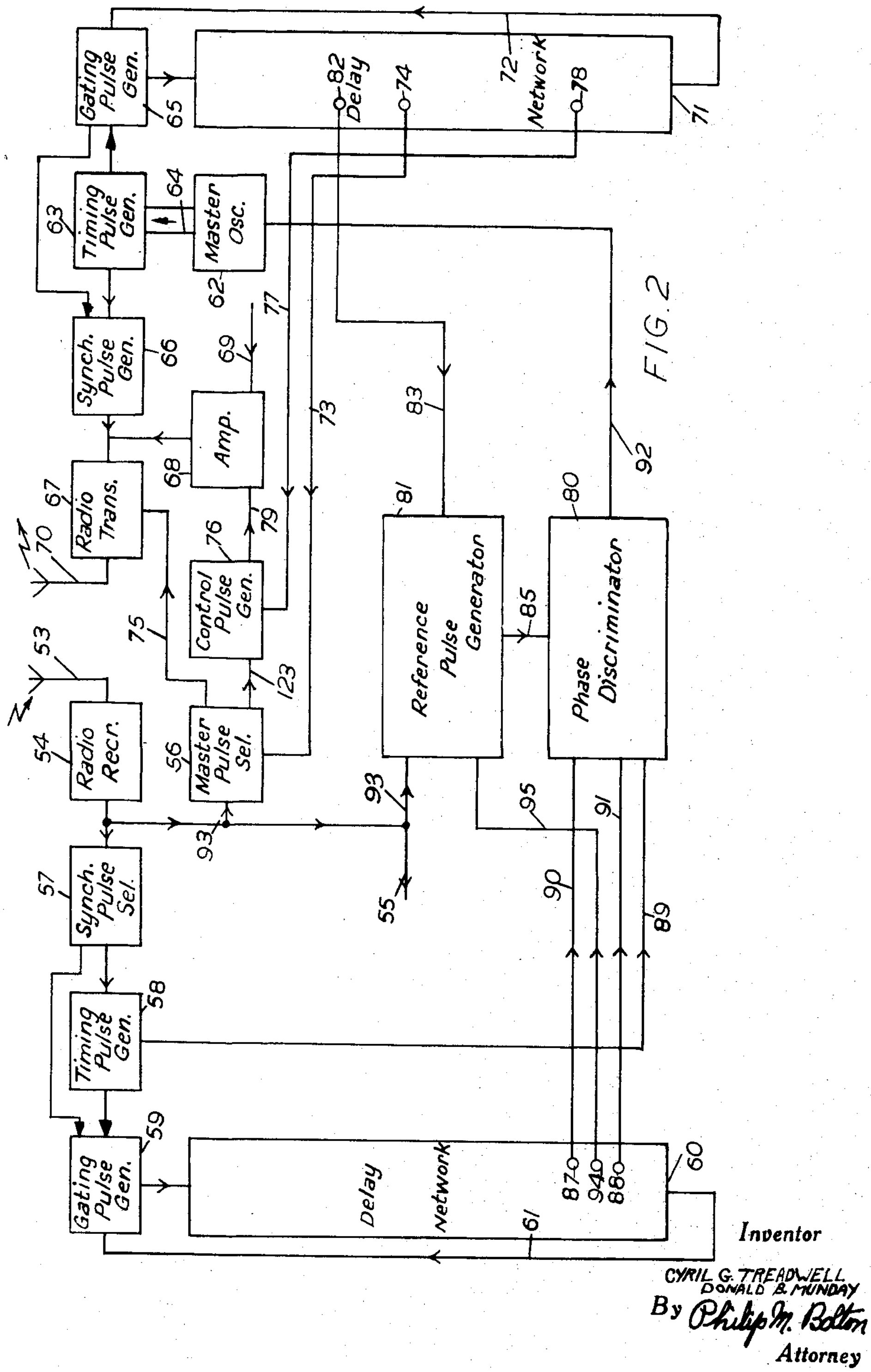
Fig. 2 shows a block schematic circuit diagram of the arrangements at the main station of the system.

Reference will now be made to the block schematic circuit diagram, Fig. 2, showing details of the arrangements at the main station 1, Fig. 1, and to the graphical diagrams of Fig. 3.

It will be assumed that the channel pulse repetition period is 120 microseconds, and that this period is divided into 28 equal channel periods, each of duration slightly les sthan 4.3 microseconds, of which 24 are used for the pulses of the 24 signalling channels, two are employed for synchronising purposes, as will be explained later, and two are left spare. In Fig. 3, diagram A shows the pulses in one repetition or synchronising period of 120 microseconds as received at the main station 1 (Figs. 1 and 2) and also pulses in part of the succeeding synchronising period. In order to save space, only the first four and the last eight channel periods are shown, and have been numbered in the series 21 to 48 to avoid confusion with previously used designation numbers. Periods 21 to 44 are occupied by channel pulses shown as vertical arrows, while period 48 is occupied by a master synchronising pulse 49 of duration 3 mircoseconds received from station 2 (Fig. 1) (or by a normal synchronising pulse of duration 2 microseconds from station 3 when station 2 is shut down), and period 46 is occupied by a marker pulse 50 of some different duration (such as ½ microsecond) received from station 3. No pulses are received or transmitted during periods 45 or 47.

Figure 3:
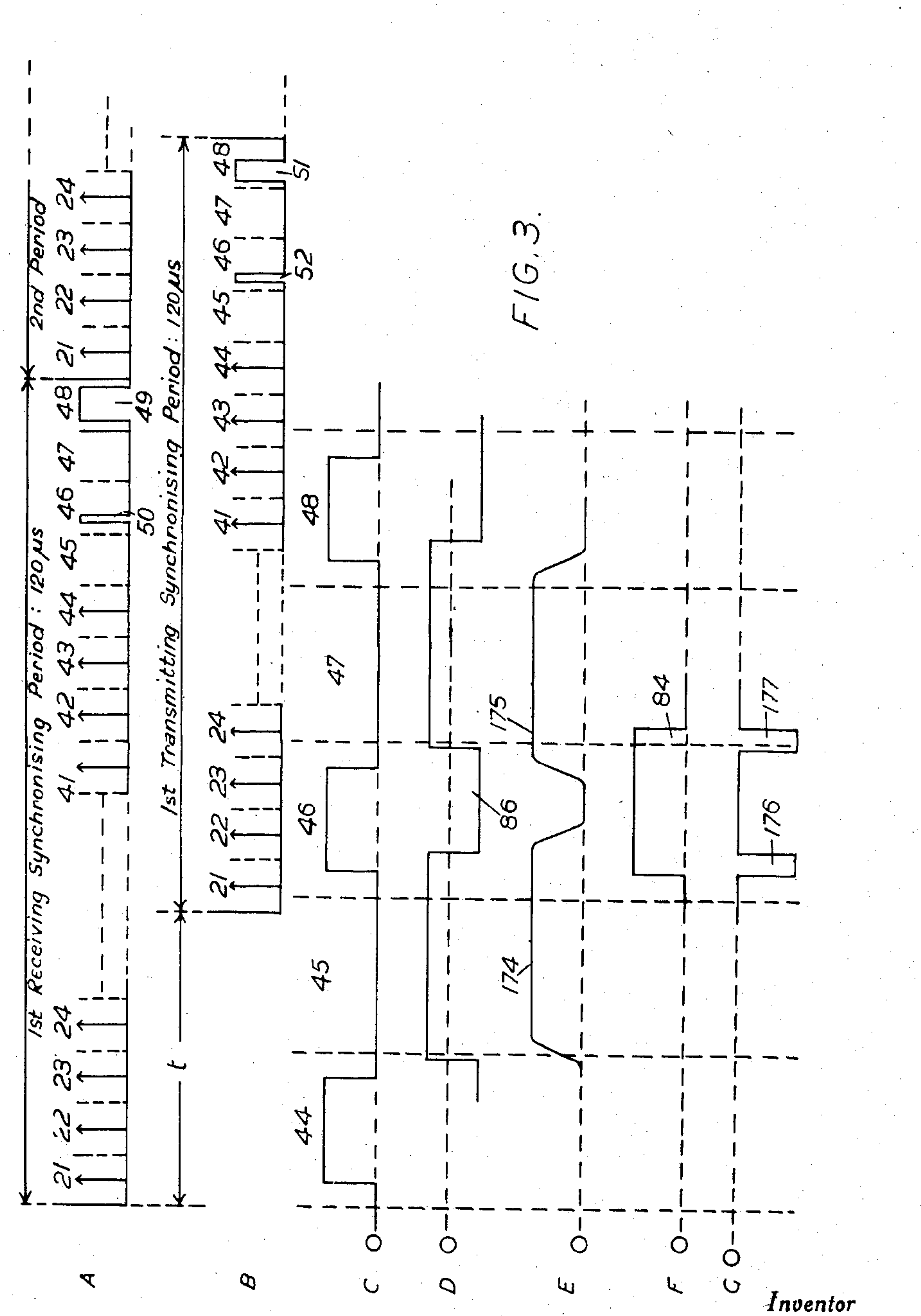
Fig. 3 shows pulse diagrams used to explain the operation of the system.

Diagram B, Fig. 3, shows the corresponding synchronising period of the pulses transmitted from station 1. It will be seen to be delayed after the period shown in diagram A by a time $t$ such that the marker pulse 50 (diagram A) is received from station 3 in the period 46. In this case a synchronising pulse 51 of 2 microseconds duration is sent out in period 48, and a control pulse 52 of duration ½ microsecond is sent out in period 46 if station 2 is shut down, but not otherwise. The pulse 51 synchronises the radio receivers 10 and 11 at stations 2 and 3, for example, in the manner described in U. S. Patent No. 2,510,987 of M. M. Levy for "Multiplex Time Modulated Electrical Pulse Demodulation System" issued June 13, 1950. The control pulse 52, however, causes the transmitter at station 3 to send out 2 microsecond synchronizing pulses in period 48 for synchronizing the receiver 18 at station 1. Normally, when station 2 is operating, the receiver 18 is synchronized by the master pulses 49, and therefore, the synchronizing pulses which would usually be supplied by station 3 must be suppressed. Thus the usual synchronizing pulse generator (not shown) at station 3 may be modified so that it is normally blocked, and the control pulses 52 which are transmitted in period 46 by the transmitter 5 only when no pulses are received from station 2, may be rectified to provide an unblocking bias for releasing the said synchronizing pulse generator so that the synchronizing pulses are generated.

The manner in which the delay $t$ is obtained and automatically maintained will be explained with reference to Fig. 2. This figure shows only those elements of the apparatus at the main station 1 which are necessary for the understanding of the invention. The majority of the channel apparatus is not shown, and may be provided as described with reference to Figs. 3 and 4 of said U. S. Patent No. 2,462,111. In Fig. 2 the pulse modulated waves are received by the antenna 53 and are demodulated in the usual way by a radio receiver 54 to produce the trains of channel and synchronising pulses shown by diagram A, Fig. 3. These pulses are delivered to the channel receiving equipment (not shown) over conductor 55, and also to a master pulse selector 56 which also includes a switching circuit whose purpose will be explained later. The device 56 will be described in detail below with reference to Fig. 4, and is additional to the usual synchronising pulse selector 57 normally provided in the system terminal, which selects the normal synchronising pulses and applies them to synchronise the timing pulse generator 58 and the gating pulse generator 59. Both of these are described in U. S. Patent No. 2,462,111 and it is only necessary to state that the timing pulse generator 58 produces two trains of positive rectangular timing pulses of duration about 3 microseconds and spaced apart by about 5.6 microseconds, the two trains being timed so that each pulse of one train occurs symmetrically in the period between two adjacent pulses of the other train; and that the gating pulse generator 59 produces a train of positive rectangular pulses of duration about 6½ microseconds, and with a repetition period of 120 microseconds.

The timing pulses of one train correspond to the odd-numbered channels, and those of the other train correspond to the even-numbered channels.

It should be added that the normal synchronising pulse selector 57 should be designed to respond to the master synchronising pulses of 3 microseconds duration, as well as to the normal synchronising pulses of 2 microseconds duration, but the master pulse selector 56 should be designed to respond only to the pulses of 3 microseconds duration.

The gating pulses are supplied from the generator 59 to one end of a delay network 60 used in known manner as a gating pulse distributor for timing the channel apparatus (not shown) with the help of the timing pulses. This network is made up of a large number of separate sections each introducing a delay of, say, 0.3 microsecond, so that by tapping the network at any section, a delay of any value to within 0.3 microsecond can be obtained. Tappings at about 4.3 microsecond intervals are used to provide the gating pulses for the various channels.

The output of the delay network 60 is connected over conductor 61 to synchronise the gating pulse generator 59 in known manner. Only those tapping points are shown which are required for the purposes of the invention. These gating arrangements for controlling the channel apparatus will be found described in U. S. Patent No. 2,462,111 with reference to Figs. 3 and 4.

On the transmitting side of Fig. 2, a master oscillator 62 supplies waves having a period of 8.6 microseconds (2 channel periods) to control a timing pulse generator 63, similar to 58, over a pair of conductors 64.

The master oscillator 62 should preferably be of the crystal controlled type, provided with means such as a reactance valve by which the frequency may slightly be varied by a frequency control voltage in a conventional manner. This type of oscillator is well known and does not need detailed description. The manner in which the control voltage is produced and applied will be explained later.

The timing pulses produced by the generator 63 are supplied to a gating pulse generator 65, similar to 59 and to a synchronising pulse generator 66 for generating the pulses 51 (Fig. 3, diagram B), which are supplied to the radio transmitter 67 together with channel pulses from the channel amplifier 68 to which pulses from the channel equipment (not shown) are applied over conductor 69. The pulse modulated waves are radiated by an antenna 70. The gating pulse generator 65 is connected to a delay network distributor 71 similar to 60, which synchronises the gating pulse generator 65 over conductor 72.

The switching circuit which forms part of the master pulse selector 56 is controlled by a gating pulse obtained over conductor 73 from a tap 74 on the transmitter delay network 71. This switching circuit controls the power supply of the radio transmitter 67 over conductor 75.

The ½ microsecond control or marker pulses 52 which are supplied to station 3 (Fig. 1) when station 2 is shut down, are produced by a control pulse generator 76 in response to a gating pulse obtained over conductor 77 from a tap 78 on the transmitter delay network 71. The generator 76 is described in detail later, with reference to Fig. 5. The control pulses are supplied over conductor 79 to the channel amplifier 68 where they are mixed with the other pulses supplied from the channel equipment (not shown) over conductor 69.

For the purpose of properly timing the reception of the pulses sent from stations 2 and 3 (Fig. 1), there are further provided a phase discriminator 80 and a reference pulse generator 81. These devices will be described in detail with reference to Figs. 7 and 6 respectively.

The accurate adjustment of the delay $t$ is effected by the marker pulses 50 (diagram A, Fig. 3) which should arrive from station 3 during the channel periods 46. However before these marker pulses can be picked up, it is necessary for the timing of the pulses transmitted from the transmitter 67 to be approximately right. To achieve this, pulses, which will be called indicating pulses, are taken from a tap 82 on the transmitter delay network 71 such that when the transmission timing is correct, the leading edge of each indicating pulse appears approximately at the same time as one of the marker pulses is due to arrive at the receiver 54 from station 3; that is, during the receiving channel period 46 shown in diagram A, Fig. 3. The indicating pulses from tap 82 are supplied over conductor 83 to the reference pulse generator 81.

Tap 82 will not generally be the channel 46 tap on the transmitter delay network 71, because of the transit time between stations 1 and 3. The position of tap 82 can however be determined from a knowledge of the path length corresponding to a return trip over paths 6, 9, 15, 17 between the stations 1 and 3, (Fig. 1).

Suppose, for example, that the total path length of the return trip is 30 kilometres. This corresponds to a transit time of about 100 microseconds, (assuming that the velocity of propagation is 3 x $10^5$ km. per sec., and that there is no synchronising delay in the device 20 at station 3 in Fig. 1; any such delay should be added to the transit time).

Since the gating pulses have a duration of about 6½ microseconds, the leading edge of a gating pulse taken from the tap corresponding to any given channel period will be about 1 microsecond inside the preceding channel period. The indicating pulse will therefore have to be delayed with respect to the corresponding channel gating pulse by about 2 microseconds to bring its leading edge approximately to the time corresponding to the marker pulse. Thus the tap 82 should be at a point corresponding to about 98 microseconds earlier than the tap used to control the pulse modulator unit of channel 46. Now 98 microseconds is practically equal to 23 channel periods, thus tap 82 should be the tap corresponding to channel 23. Since 100 microseconds is 20 microseconds less than a complete synchronising period, the delay $t$ (Fig. 2) will be 20 microseconds (or about 4⅔ channel periods) in this particular case.

Diagrams C to G of Fig. 3 show the channel periods 44 to 48 to a larger scale than diagrams A and B, in order to make clear the operation of the phasing arrangements, which will now be briefly referred to, and explained in more detail later.

The reference pulse generator 81 generates a reference pulse 84, (Fig. 3, diagram F), in response to the indicating pulse obtained from tap 82. The leading edge of pulse 84 occurs early in the receiving period 46, and the reference pulse is supplied to the phase discriminator 80 over conductor 85.

A timing pulse 86 (Fig. 3, diagram D) is obtained by selecting and inverting and slightly delaying the timing wave corresponding to the even numbered channels from the receiver timing wave generator 58. The timing pulses are combined with gating pulses obtained from two taps 87 and 88 on the receiver delay network 60 as described below in connection with Fig. 7. Tap 88 will be the same as the tap for channel 47, while tap 87 will be a tap perhaps 1 microsecond later than the tap for channel 45.

The timing pulses 86 are supplied to the phase discriminator 80 over conductor 89, and the gating pulses over conductors 90 and 91.

The phase discriminator 80 supplies to the master oscillator 62 over conductor 92 the frequency control voltage already mentioned. The magnitude and sign of the control voltage are determined by the degree of overlap of the pulse 84 with the pulse 86. The control voltage is zero when the overlaps are equal. The master oscillator 62 should be adjusted to produce a frequency which differs by a very small percentage from the frequency of the oscillator (not shown) at the master station 2 which is used for controlling the timing of the pulses transmitted to the station. Thus it will be seen that the reference pulse 84 will drift along the synchronising period (diagram A, Fig. 3) until it reaches channel period 46, when it overlaps pulse 86 and generates the control voltage which modifies the phase of the oscillator 62 in such manner as to hold the pulse 84 symmetrically with respect to the pulse 86.

During the process which has just been described, the radio transmitter 67 is switched off by the master pulse selector 56 to prevent any pulses from being transmitted to station 3, in consequence of which no pulses can be received by the receiver 54 from station 3, which pulses would interfere with the adjustment. However, when the adjustment is completed, a coincidence in the master pulse selector 56 between gating pulses obtained from tap 74 and the master pulses received from the master station 1 switches the radio transmitter 67 on over conductor 75.

The received pulses are supplied over conductor 93 to the reference pulse generator 81, and the marker pulses 50 (diagram A, Fig. 3) which now arrive from station 3 are selected and gated in by gating pulses from tap 94 of the receiver delay network 60 supplied over conductor 95. Tap 94 will be about half way between the taps for channels 46 and 47. The receipt of the marker pulses by the reference pulse generator 81 causes the indicating pulses from tap 82 to be blocked out, and the reference pulses 84 (diagram F, Fig. 3) now to be generated in response to the said marker pulses, which now control the oscillator 62 instead of the indicating pulses, and make and maintain a final accurate adjustment of the timing.

Detailed circuits of the devices 56, 76, 81 and 80 of main station 1 are given in Figs. 4 to 7, and their operation will now be fully explained.

The external terminals of these circuits will be given the same designations as the conductors shown in Fig. 2 to which such terminals are connected, in order to make clear the relation between Figs. 4 to 7 and Fig. 2.

Figure 4:
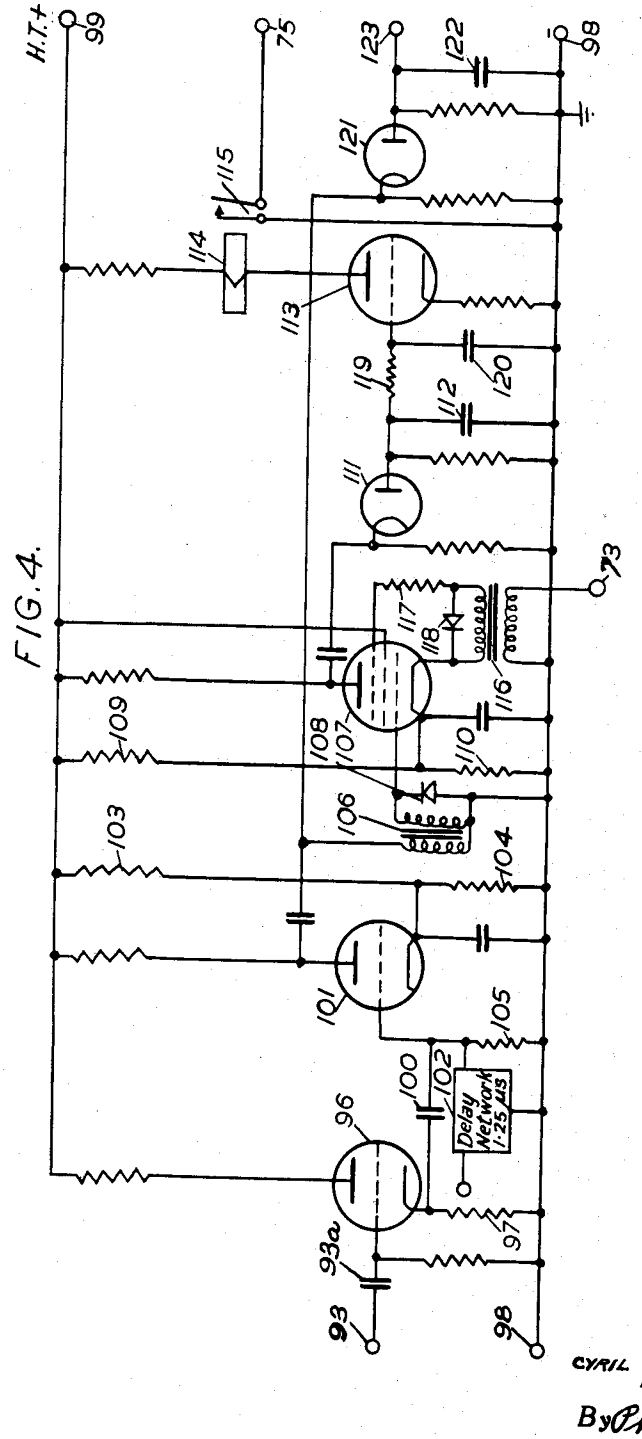
Figs. 4 to 7 show schematic circuit diagrams of certain elements of Fig. 2.

Fig. 4 shows the circuit of the master pulse selector 56, Fig. 2, which includes the switching circuit for controlling the power for the radio transmitter 67. The pulses received from stations 2 and 3 (Fig. 1) after demodulation by the radio receiver 54 (Fig. 2) are applied in positive sense to terminal 93 (Fig. 4) and thence through a blocking capacitor **93*a* to an amplifying valve 96 having a load resistor 97 connected in series between the cathode and the negative terminal 98 for the high tension source (not shown) for the valves of the circuit, the corresponding positive high tension terminal being 99. The cathode of the valve 96 is connected through a blocking capacitor 100 to the control grid of a selector valve 101. This control grid is connected to ground through the input circuit of a delay network 102** having a delay of 1.25 microseconds, with the output circuit left open.

The valve 101 is biased below cut off by connection of the cathode to the junction point of two resistors 103, 104 connected in series between terminals 98 and 99. The bias should be such that any pulse applied to terminal 93 by itself is unable to unblock the valve 101. However, pulses arriving at the control grid of the valve 101 are transmitted through the delay network 102 and will be reflected back without inversion at the open end, and arrive again at the control grid after 2.5 microseconds. Since the master synchronising pulses transmitted from station 2 (Fig. 1) have a duration of 3 microseconds, the leading edge of each master pulse will arrive at the control grid of the selecting valve 101 before the trailing edge of the pulse before reflection has disappeared. The valve 101 should therefore be biased so that it can be unblocked under these circumstances and so a negative output pulse of duration about ½ microsecond will be generated at the anode of the valve 101. None of the other pulses received from station 2 or 3 have a duration sufficient to unblock the valve 101, which therefore produces output pulses in response only to the master synchronising pulses.

A resistor 105 of suitable value is provided to terminate the input circuit of the delay network 102 so that no further reflections are obtained from the input terminals.

The negative pulses generated in response to the master pulses at the anode of the selecting valve 101 are inverted by a transformer 106 and applied in positive sense to the control grid of a gating pentode valve 107. A rectifier 108 may be connected across the secondary winding of the transformer 106 so as to dump out any oscillation which might be excited in the transformer.

The valve 107 is normally biased below cut-off by the connection of the cathode to the junction point of two resistors 109, 110 connected between terminals 98 and 99, but the bias should be such that so long as the suppressor grid is at cathode potential, the pulses applied to the control grid are able to unblock the valve, thereby passing to a rectifier circuit including a diode 111 which builds up a negative bias potential in the capacitor 112.

A switching valve 113 has a relay 114 in series with the anode circuit and under normal conditions there will be sufficient anode current to maintain the relay operated, thus closing the contacts 115 and switching on the radio transmitter 67 (Fig. 2) over terminal and conductor 75. If, however, master synchronising pulses are present at terminal 93, and can pass through the gating valve 107, the blocking bias generated in capacitor 112 which is applied to the control grid of the valve 113, will cut off the valve thereby switching off the radio transmitter. However, as already explained, pulses obtained from the transmitter delay network 71 (Fig. 2) are supplied over conductor and terminal 73, and after inversion by the transformer 116 are applied through resistor 117 to the suppressor grid negatively with respect to the cathode, thereby cutting off the gating valve. Thus if the master synchronising pulses occur during the same period as the pulses applied to terminal 73, they will be cut off from the rectifier 111 and the valve 113 will be unblocked thus operating the relay 114 and switching on the radio transmitter. It may be recalled that the pulses applied to terminal 73 are taken from a tap 74 on transmitter delay network 71 which corresponds to the receiving channel period 48 (diagram A, Fig. 3), and this tap will be a little earlier than the tap corresponding to channel 25 in the particular case for which Fig. 3 has been drawn. Thus it will be seen that the radio transmitter will be switched off if any master pulses arrive from station 2 during any channel periods other than receiving period 48 (diagram A, Fig. 3).

It may be added that a rectifier 118 may be provided to shunt the secondary winding of the transformer 116 in order to damp out any oscillations. Also, in order to delay slightly the switching off of the radio transmitter, a series resistor 119 and a shunt capacitor 120 with a suitable time constant may be provided between the condenser 112 and the valve 113.

The anode of the selecting valve 101 is also connected to a second rectifier circuit including a diode 121 arranged to build up a negative bias potential in the capacitor 122. This bias potential is applied through terminal and conductor 123 to the control pulse generator 76 (Fig. 2 and Fig. 5) in order to stop the generation of the control pulses 52 (diagram B, Fig. 3)—which are supplied in period 46 to the station 3—when master pulses are received from station 2, as already mention.

Figure 5:
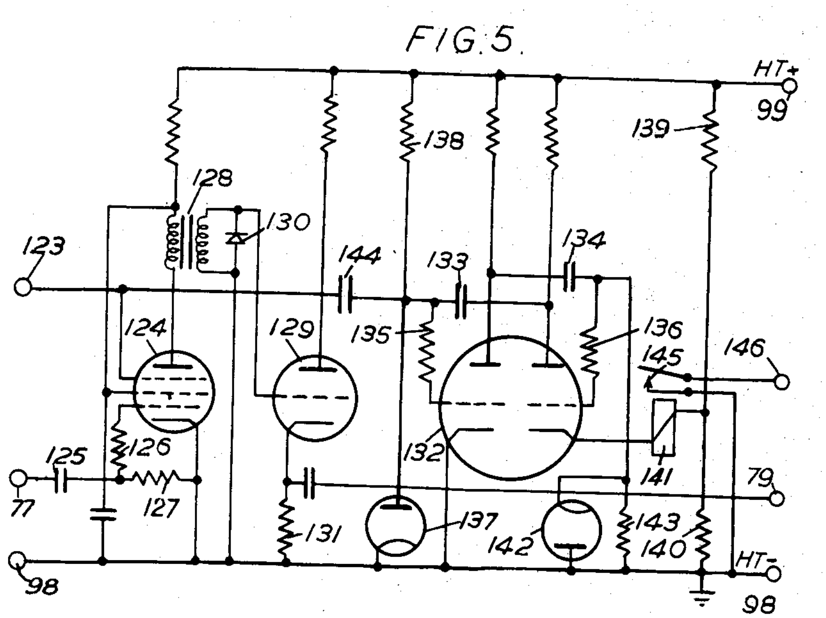

Fig. 5 shows details of the control pulse generator 76 (Fig. 2) which generates pulses 52 of Fig. 3, diagram B in absence of master synchronizing pulses 49 for master station 2. Gating pulses from tap 78 of the delay network 71 are applied over conductor and terminal 77 in positive sense to the control grid of the pentode valve 124 through a capacitor 125 and a resistor 126. A second resistor 127 connects the junction point of the elements 125 and 126 to the cathode and ground. The control grid is arranged to act as a rectifier by driving it positive so that grid current is produced. This generates across the resistor 127 a voltage which biases the valve to cut off in such manner that it only conducts substantially at the maximum amplitude of the gating pulses.

The negative output pulses from the anode of the valve 124 are differentiated and inverted by the transformer 128 and short positive differential pulses corresponding to the leading edges of the gating pulses are applied to the control grid of the amplifying valve 129. A rectifier 130 is connected across the secondary winding of the transformer 128 to eliminate the negative differential pulses. Amplified positive control pulses are derived from a load resistor 131 connected in series between the cathode of the valve 129 and ground, and are supplied from an output terminal 79 to the channel amplifier 68 (Fig. 2).

It has already been stated that the control pulses are suppressed when master synchronising pulses are received from station 2 (Fig. 1). Accordingly the negative bias voltage derived from these pulses in the master pulse selector 56 (see Fig. 4) is applied to the suppressor grid of the valve 124 from terminal 123 (Fig. 5), and cuts off this valve while any master pulses are present, thus preventing the control pulses from being generated.

Referring to Fig. 3, diagram B, it will be seen that the control pulse 52 occurs early in period 46. It has already been stated that the control pulse corresponds to the leading edge of the gating pulse obtained from tap 78 on the delay network 71 (Fig. 2). The gating pulse which would be used to gate the pulse for channel 46 (if there were one) would actually have its leading edge in period 45, since the gating pulses are of longer duration than the channel periods. Thus if the tap 78 be at a point about half way between the taps normally used for periods 46 and 47, the leading edge, and the corresponding control pulse, will be brought into period 46 as desired. The actual position of these pulses in the period is not critical.

The remaining elements in Fig. 5 are concerned with the arrangements for preventing breakdown of connections in operation between stations 1 and 3 when station 2 comes into operation after a shut down period. A double triode valve 132 is connected as a conventional multivibrator with the anodes cross-connected to the opposite control grids through capacitors 133, 134, resistors 135, 136. The control grid of the left-hand section of the valve 132 is connected to the junction point of a diode 137 and a resistor 138 connected in series between the terminals 98 and 99, the diode having its cathode connected to ground. The right-hand section is normally non-conducting on account of the connection of the cathode to the junction point of the resistors 139 and 140 also connected in series between terminals 98 and 99. A relay 141 is connected in series with the right hand cathode and will accordingly be normally unoperated. A diode 142 is connected across the grid resistor 143 with its anode grounded. The diodes 137 and 142 are included to prevent a pulse from being transmitted to other circuits connected to terminal 123 when the multivibrator returns to the normal condition.

When station 2 comes into operation, the master synchronizing pulses are received at station 1 and the negative bias potential which then appears at terminal 123 will be applied through the capacitor 144 and resistor 135 to the left hand control grid, and will switch the multivibrator over so that the right hand half of the valve 132 conducts and operates the relay 141, closing the contacts 145, thereby placing ground on terminal 146 which is connected to conventional channel supervisory relay circuits (not shown) and holds all relays in the positions in which they were last set, by a conventional relay circuit which it is not necessary to describe.

After a period determined by the time constants of the circuits associated with the valve 132, (which may for example be 2 or 3 seconds) the multivibrator returns to normal and releases the relay 141. The period during which the relay 141 is operated should be long enough to allow the completion of the re-phasing operations consequent upon the re-entry of station 2 after a shutdown period.

Figure 6:
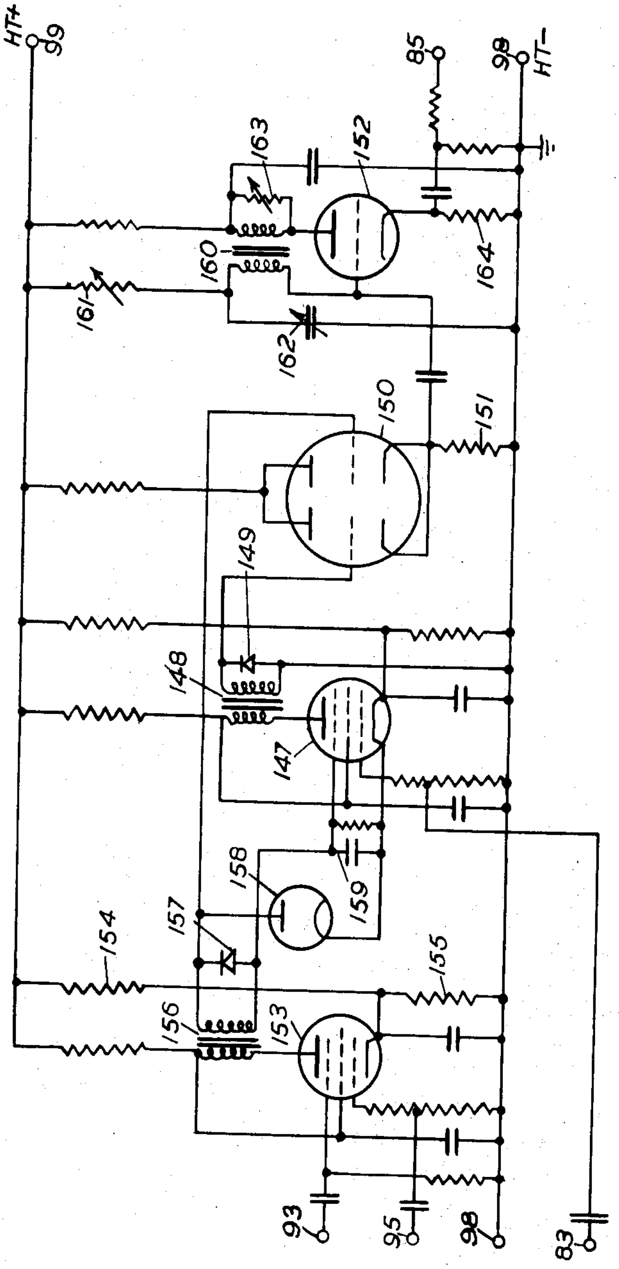

Fig. 6 shows details of the reference pulse generator 81 (Fig. 2). As already explained, when the master station 2 resumes operation after a shut-down period the timing of the pulses transmitted from station 1 will be incorrect and the marker pulses from station 3 will not arrive during the receiving channel period 46. An approximate adjustment is therefore made with the help of indicating pulses obtained from the tap 82 of the transmitter delay line 71 (Fig. 2) and supplied over conductor 83. The tap 82 is at such a point that the leading edges of the gating pulses obtained therefrom occur in period 46 at approximately the same times as the marker pulses from station 3 should arrive.

Referring to Fig. 6, the indicating pulses will be applied in positive sense to terminal 83 and thence to the control grid of an amplifying valve 147. The negative amplified pulses are inverted by an output transformer 148 which also differentiates them, and a rectifier 149 removes the negative differential pulses corresponding to the trailing edges of the indicating pulses.

The positive differential pulses are applied to the control grid of one half of a double triode valve 150, having the anodes and cathodes respectively connected together. The output amplified pulses are taken from the cathodes, which are connected to ground through a load resistor 151, and are applied as trigger pulses to synchronise a blocking oscillator circuit including a valve 152.

It will be clear that the trigger pulses applied to the valve 152 will occur approximately at the times when the marker pulses 50 (diagram A, Fig. 3) should arrive in periods 46, when proper phasing has been stabilised. In response to the trigger pulses, the valve 152 then generates the reference pulses 84 (diagram F, Fig. 3).

The channel pulses from the radio receiver 54 (Fig. 2) are applied to terminal 93 and thence to the suppressor grid of a gating valve 153. This valve is provided with positive cathode bias from the resistors 154 and 155 connected in series between terminals 98 and 99, sufficient to cut off the anode current unless both the control grid and the suppressor grid are simultaneously raised to a sufficient positive potential. Gating pulses from tap 94 of the receiving delay network 60 (Fig. 2) are applied in positive sense to terminal 95 of Fig. 6 and thence to the control grid of the valve 153. Therefore as soon as an approximate adjustment of the phasing has been made by means of the pulses from valve 147, the marker pulses from station 3 will be gated in through the valve 153. They are differentiated and inverted by the transformer 156 in the anode circuit of valve 153, and the negative differential pulses are removed by the rectifier 157.

A diode rectifier 158 rectifies the pulses produced by the transformer 156, and builds up a potential in the capacitor 159 connected between the suppressor grid and the cathode of the valve 147, thereby biasing the suppressor grid negatively to the cathode and cutting off the valve 147. The pulses from the valve 147 are thereby blocked out.

The pulses generated by the transformer 156 are also applied to the right-hand control grid of the valve 150 and now produce the trigger pulses which synchronise the valve 152. In this way a final accurate adjustment of the phasing is carried out by the marker pulses, which have now replaced the indicating pulses for synchronisation of the blocking oscillator.

The valve 152 has its anode circuit coupled to the control grid circuit through a transformer 160 thereby forming a blocking oscillator which generates rectangular reference pulses whose repetition period is determined mainly by the values of the resistor 161 and the capacitor 162, which may be adjustable. The repetition period for free oscillation should be adjusted to be a little greater than 120 microseconds, so that it can be synchronized accurately to 120 microseconds by the trigger pulse from the resistor 151.

The duration of the reference pulses should be adjusted (by means of the resistor 163 shunting the primary winding of the transformer 160) to about 4 microseconds, that is, a little greater than the duration of the timing pulses produced by the timing pulse generator 58 (Fig. 2).

Figure 7:
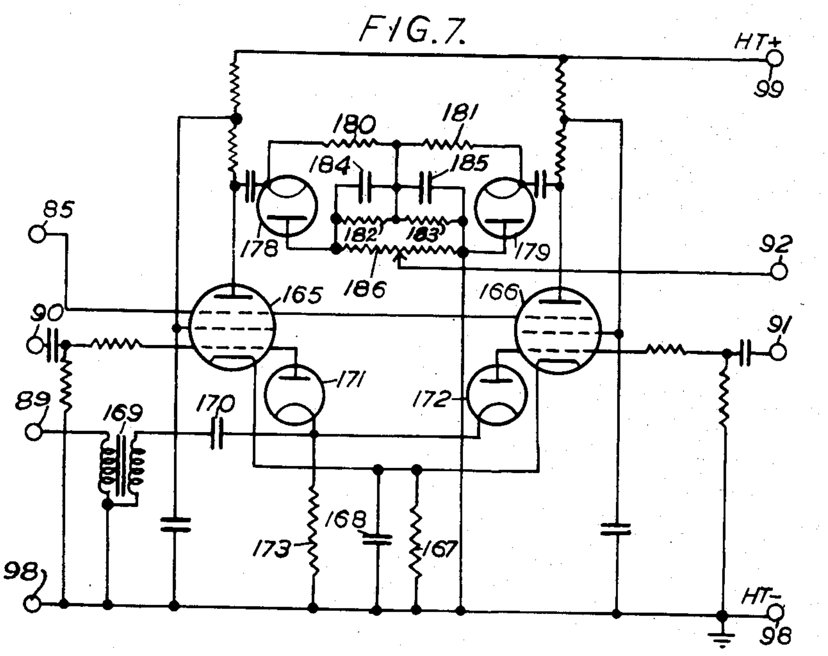

The reference pulses are obtained from the cathode of the valve 152 which is connected to ground through a load resistor 164, and are supplied to the output terminal 85 and thence to the phase discriminator 80 (Fig. 2 and Fig. 7).

Fig. 7 shows details of this phase discriminator. It includes two gating valves 165, 166 the cathodes of which are connected to ground through a bias resistor 167 shunted by a capacitor 168 both of large value. As will appear presently the valves are normally cut off, but are periodically unblocked, so that the capacitor 168 becomes charged to the necessary cut off potential. The elements 167, 168 should therefore have a large time constant.

The reference pulses 84 (diagram F, Fig. 3) generated by the circuit of Fig. 6, are applied to terminal 85 (Fig. 7) and thence to both the suppressor grids in common. Gating pulses from taps 87 and 88 of the receiving delay network 60 (Fig. 2) are supplied over conductors and terminals 90 and 91 (Fig. 7) in positive sense respectively to the control grids of the valves 165 and 166. The timing pulses for even-numbered channels are supplied from the timing pulse generator 58 (Fig. 2) over conductor and terminal 89 to a transformer 169 connected to invert the timing pulses, which are applied through a blocking capacitor 170 and two diodes 171 and 172 respectively to the control grids of the valves 165 and 166. The cathodes of the two diodes are connected to ground through a resistor 173.

Referring now to Fig. 3, the gating pulses obtained from taps 87 and 88 of the receiving delay network 60 (Fig. 2) are shown respectively at 174 and 175 in diagram E. Pulse 175 overlaps squarely the channel period 47, but pulse 174 is somewhat later than the pulse which would normally be required for period 45 if these were a channel pulse in this period. The pulses 174 and 175 will generally have rather curved leading and trailing edges, on account of the distortion produced by the delay network, and the pulses should be timed so that the trailing edge of pulse 174 and the leading edge of pulse 175 both occur wholly within the period of the timing pulse 86 (diagram D).

The negative timing pulse 86 and the positive gating pulse 174 will both be applied to the valve 165 which will therefore be unblocked as regards the control grid until the occurrence of the leading edge of the timing pulse. It will however, be blocked by the suppressor grid until the occurrence of the leading edge of the reference pulse 84.

Thus the valve conducts only in the interval between the leading edges of the pulses 84 and 86, and thus a negative output pulse 176 (diagram G) will be produced at the anode of valve 165. By analogous reasoning it will be clear that the valve 166 will generate a negative pulse 177 during the period between the trailing edges of the pulses 84 and 86. If the reference pulse is symmetrically placed with respect to the timing pulse, the pulses 176 and 177 will be of equal duration.

The pulses generated by the valves 165 and 166 are rectified by a pair of balanced rectifying circuits comprising diodes 178, 179, resistors 180, 181, 182, 183 and capacitors 184 and 185. A potentiometer 186 connects the anodes of the two diodes and the moving contact is connected to an output terminal 92. The anode of the rectifier 179 is connected to ground.

When the pulses respectively generated by the valves 165 and 166 are equal in duration, the charges supplied to the capacitors 184 and 185 will be equal, the difference of potential between the anodes of the diodes will be zero, and the potential applied to terminal 92 will also be zero. However, if the reference pulse 84 is too early, the duration of the pulses 176 generated by the valve 165 will be increased and the duration of the pulses 177 generated by the valve 166 will be decreased by the same amount. In these circumstances, the capacitor 184 will acquire a larger charge than the capacitor 185 and a negative potential will appear at terminal 92. Likewise, it is clear that if the reference pulse is too late a positive potential will appear on terminal 92. The potential appearing at terminal 92 is applied to adjust the frequency of the master oscillator 62 (Fig. 2) in such a direction as to shift the reference pulse 84 so that it occurs symmetrically with respect to the timing pulse 86.

As already explained, the reference pulses 84 are generated in response to the marker pulses transmitted from station 3. The leading edge of each of these marker pulses is generated from the leading edge of the corresponding timing pulse in period 46. (Fig. 3, diagram C), at station 3. For proper timing the marker pulses should arrive at station 1 with their leading edges in coincidence with the leading edges of the timing pulses at station 1. Since the reference pulses are of longer duration than the timing pulses, it is necessary to delay the timing pulse 86 by about ½ microsecond so that the leading edge of the reference pulse 84 may line up with the leading edge of the corresponding timing pulse (diagram C), when it is properly phased. This delay may be produced in the transformer 169 (Fig. 7), or if necessary, a suitable delay network (not shown) may be included.

Figure 8:
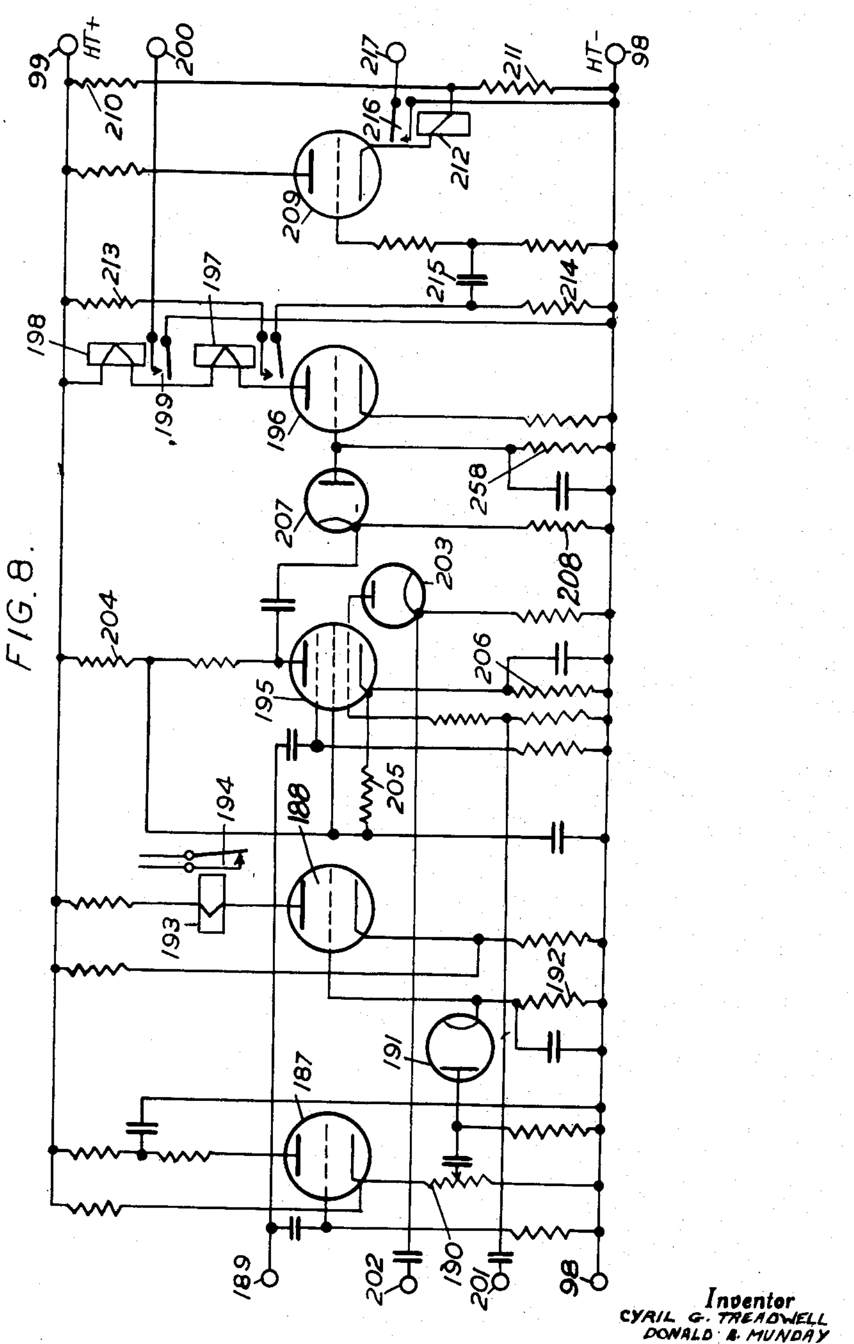
Fig. 8 shows a schematic circuit diagram of the switching arrangements at one of the satellite stations of the system.

Fig. 8 shows details of the switching arrangements at station 3. The following operations have to be carried out at this station.

(1) When no pulses are received from station 1, it is necessary to switch off the pulse modulator circuits, and also the channel receiver units in order to prevent intermittent noises from being transmitted to the local lines.

(2) When the master station 2 is shut down, control pulses are sent from station 1 which must switch on the normal synchronising pulses which are used to synchronise the receiving equipment at station 1. When the control pulses disappear, the synchronising pulses must be switched off.

(3) The supervisory relays must be held in their present positions during the synchronising period after the master station 1 comes into operation. This period might be 3 seconds, as in the case of station 1.

Operation No. 1 is carried out by two valves 187 and 188. The pulses received from station 1 (after demodulation from the carrier wave in the radio receiver (not shown) at station 3) are applied in positive sense to terminal 189 and thence to the control grid of valve 187. Positive pulses are taken from the movable contact of a potentiometer 190 connected between the cathode and ground, and are rectified by the diode 191 to produce a positive bias potential across the load resistor 192 which unblocks the valve 188 thus operating the relay 193 connected in series with the anode circuit. So long as any pulses are received from station 1 the relay 193 is held operated and maintains the normal channel connections by closing the contacts 194 which are connected to the channel equipment (not shown).

When the transmitter at station 1 is switched off, relay 193 will be released, and the channel apparatus at station 3 will be switched off.

Operation No. 2 is carried out by a gating valve 195 which controls a valve 196 having two relays 197, 198 connected in series with the anode circuit. Valve 196 is normally conducting and maintains both relays operated. The contacts 199 of relay 198 control through terminal 200 the synchronising pulse generator (not shown) at station 3, and when these contacts are closed, the generator is switched off.

Gating pulses for the channel 46 tap of the receiving delay network distributor (not shown) at station 3 are applied in positive sense to terminal 201 and thence to the control grid of valve 195. This delay network is arranged similarly to the network 60 at station 1 (Fig. 2).

The timing wave corresponding to even numbered channels is applied in positive sense to terminal 202 and thence through the diode 203 to the control grid of valve 195. This valve is normally blocked by a positive bias applied to the cathode by the resistor chain 204, 205, 206 and will be unblocked only during channel period 46 when the timing pulse coincides with the channel 46 gating pulse. The pulses applied at terminal 189 are also applied to the suppressor grid of valve 195, and so if any control pulses are present, they will be picked out by the gating valve and will appear as negative pulses in the anode circuit. The negative control pulses so picked out are rectified by the diode 207 to produce a negative bias across the resistor 208 which cuts off the valve 196, thus releasing the relay 198, and switching on the normal synchronising pulses.

Operation No. 3 is effected by the valve 209 in response to the operation of relay 197 when the control pulses disappear after the transmitter at station 1 has been switched off. Valve 209 is normally cut off by the cathode bias produced by the resistors 210 and 211, and the relay 212 connected in series with the cathode will be unoperated.

However when relay 197 operates, it applies a positive impulse obtained from resistors 213 and 214 through the capacitor 215 to the control grid of the valve 209, thus unblocking the valve and operating the relay 212. The contacts 216 of this relay hold through terminal 217 the supervisory relays (not shown) at station 3.

After a period determined by the time constant of the circuit associated with the control grid of the valve 209, the capacitor 215 discharges and the valve 209 becomes again blocked thereby releasing relay 212, and removing the hold on the supervisory relays. The time constant should be chosen so that the relays are held for about 3 seconds.

While the principles of the invention have been described above in connection with specific embodiments, and particular modifications thereof, it is to be clearly understood that this description is made only by way of example and not as a limitation on the scope of the invention.

What is claimed is:

1. An electric multichannel pulse system for communication between a plurality of stations each having a transmitter and receiver and communicating by the transmission and reception of pulses therebetween including a main station, a master satellite station, and a second satellite station, in which some of the channels terminating at the main station operate to the master station, while others operate to the second satellite station, and in which the signalling time is divided into a plurality of recurring channel periods, two of which recurring periods are set aside respectively as phasing and synchronising periods, comprising means for transmitting from the master station a train of master synchronising pulses during the synchronising periods for synchronising the reception and transmission of pulses at the main station, means at the main station for transmitting a train of normal synchronising pulses during the synchronising periods for synchronising the reception of pulses at both satellite stations, means at the main station for delaying the transmission of a normal synchronising pulse after the reception of a corresponding master synchronising pulse, means at the second satellite station synchronized by normal synchronizing pulses from the main station for transmitting marker pulses during the phasing periods, and said master synchronizing pulses, said normal synchronizing pulses and marker pulses being distinguished from each other and from the signal pulses in their characteristics, means at the main station for separating the marker, master synchronizing pulses and normal synchronizing pulses from each other and from the signal pulses to control the operations thereof, means at the second satellite station for separating the normal synchronizing pulses from each other and the signal pulses, means at the main station controlled by said marker pulses for automatically varying the transmission delay until the marker pulses fall into the phasing periods thereat so that all channel pulses are received at the main station during their respective channel periods.

2. A system according to claim 1 further comprising means at the main station operating in response to the disappearance of the master synchronising pulses consequent on the shutting down of the transmitter at the master station for transmitting to the second satellite station a train of control pulses during the phasing periods distinguished in their characteristics from the signal pulses and the normal synchronizing pulses, and means at the second satellite station operating in response to the receipt of control pulses for transmitting normal synchronising pulses during the synchronising periods for synchronising the reception of pulses at the main station.

3. A system according to claim 2 further comprising a transmitter gating pulse distributor at the main station producing indicating pulses, means at the main station controlled by said indicating pulses for making an approximate adjustment of the transmission delay after resumption of transmission from the master satellite station, and means operating in response to the receipt of the marker pulses for transferring the control of the adjustment to the said marker pulses from the indicating pulses.

4. A system according to claim 3 comprising means at the main station operating in response to the receipt of master synchronising pulses for switching off the pulse transmitter until the approximate adjustment of the said delay is completed.

5. A system according to claim 3 further comprising channel supervisory relays at the main station and means at the main station operating in response to the reception of master synchronising pulses for maintaining all channel supervisory relays at the main station in the positions in which they are set, for a period long enough to cover the completion of the automatic adjustment of the transmission delay.

6. A system according to claim 3 further comprising channel supervisory relays at the second satellite station and means at the second satellite station operating in response to the disappearance of the control pulses consequent on the resumption of transmission from the master satellite station for maintaining all channel supervisory relays at the second satellite station in the position in which they are set, for a period long enough to cover the completion of the automatic adjustment of the transmission delay.

References Cited in the file of this patent

UNITED STATES PATENTS

| | | |
|---|---|---|
| 2,457,986 | Edson | Jan. 4, 1949 |
| 2,584,739 | Rees et al. | Feb. 5, 1952 |